(12) United States Patent
Gao et al.

(10) Patent No.: US 12,210,113 B2
(45) Date of Patent: Jan. 28, 2025

(54) RADIO SIGNAL SENDING METHOD AND APPARATUS

(71) Applicant: Huawei Technologies Co., Ltd., Shenzhen (CN)

(72) Inventors: Lutao Gao, Beijing (CN); Sha Ma, Beijing (CN); Sida Song, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 459 days.

(21) Appl. No.: 17/390,310

(22) Filed: Jul. 30, 2021

(65) Prior Publication Data

US 2021/0356556 A1 Nov. 18, 2021

Related U.S. Application Data

(63) Continuation of application No. PCT/CN2020/071153, filed on Jan. 9, 2020.

(30) Foreign Application Priority Data

Jan. 30, 2019 (CN) .......................... 201910093559.6

(51) Int. Cl.
  *G01S 7/02* (2006.01)
  *G01S 13/87* (2006.01)
  *G01S 13/931* (2020.01)
  *H04L 67/12* (2022.01)

(52) U.S. Cl.
  CPC .......... *G01S 7/0232* (2021.05); *G01S 13/872* (2013.01); *G01S 13/931* (2013.01); *H04L 67/12* (2013.01)

(58) Field of Classification Search
  CPC .... G01S 7/0232; G01S 13/872; G01S 13/931; H04L 67/12
  See application file for complete search history.

(56) References Cited

U.S. PATENT DOCUMENTS

| | | |
|---|---|---|
| 2008/0136702 A1 | 6/2008 | Tsuchihashi et al. |
| 2009/0201194 A1 | 8/2009 | Winkler et al. |
| 2012/0235857 A1 | 9/2012 | Kim et al. |
| 2013/0027240 A1 | 1/2013 | Chowdhury |
| 2015/0042507 A1 | 2/2015 | Jeong et al. |
| 2015/0226848 A1* | 8/2015 | Park ..................... G01S 13/584 342/93 |
| 2015/0331090 A1 | 11/2015 | Jeong et al. |

(Continued)

FOREIGN PATENT DOCUMENTS

| | | |
|---|---|---|
| CN | 101089653 A | 12/2007 |
| CN | 202141803 U | 2/2012 |

(Continued)

*Primary Examiner* — Peter M Bythrow
*Assistant Examiner* — Nazra Nur Waheed
(74) *Attorney, Agent, or Firm* — Conley Rose, P.C.

(57) ABSTRACT

A method related to processing interference between cooperative radars, where a radar obtains configuration information used to indicate a ratio of a quantity of first data update periods to a quantity of second data update periods in a sending period. The first data update period is used to send a first radio signal, and the second data update period is used to send a second radio signal. Waveform configurations of the first radio signal and the second radio signal are different, to effectively reduce mutual interference between the first radio signal and the second radio signal.

20 Claims, 6 Drawing Sheets

(56) References Cited

U.S. PATENT DOCUMENTS

2017/0146647 A1    5/2017  Lim et al.
2017/0276770 A1    9/2017  Lin et al.
2018/0267144 A1*   9/2018  Lin .................. G01S 7/4021

FOREIGN PATENT DOCUMENTS

| CN | 102662161 | A |   | 9/2012 |   |   |
|----|-----------|---|---|--------|---|---|
| CN | 102680963 | A |   | 9/2012 |   |   |
| CN | 102893173 | A |   | 1/2013 |   |   |
| CN | 104280729 | A |   | 1/2015 |   |   |
| CN | 104345311 | A |   | 2/2015 |   |   |
| CN | 106959446 | A |   | 7/2017 |   |   |
| CN | 107356919 | A |   | 11/2017 |   |   |
| KR | 20090067990 | A |   | 6/2009 |   |   |
| WO | WO-2011106881 | A1 | * | 9/2011 | ........... | G01S 13/345 |

* cited by examiner

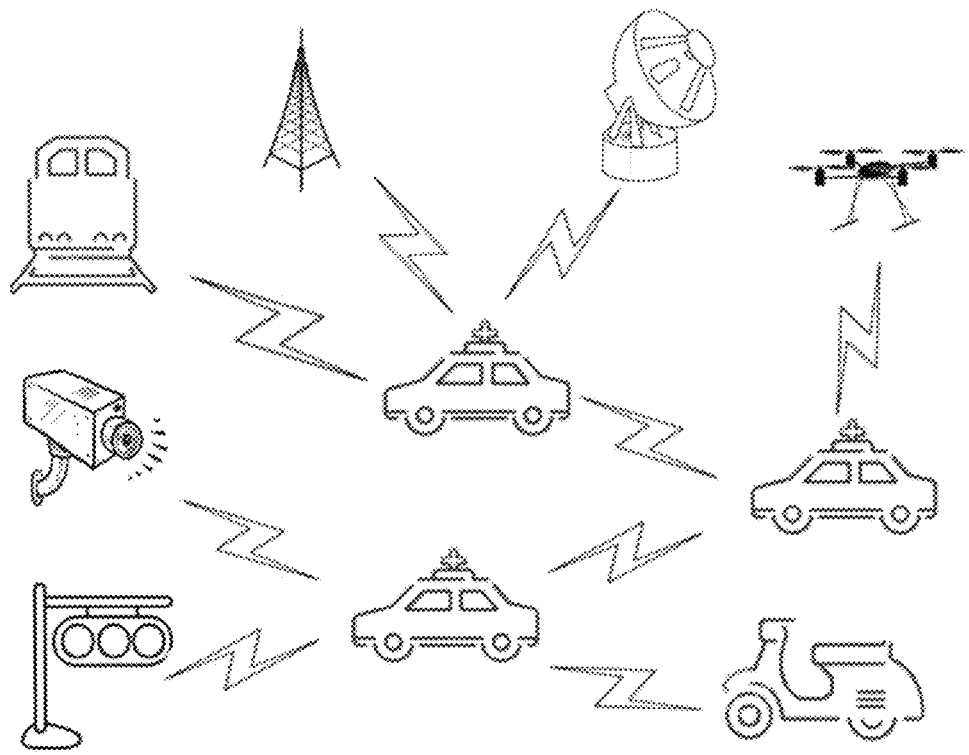

FIG. 5

Obtain configuration information, where the configuration information is used to indicate a ratio of a quantity of first data update periods to a quantity of second data update periods, the first data update period is used to send a first radio signal, the second data update period is used to send a second radio signal, and waveform configurations of the first radio signal and the second radio signal are different — S101

Transmit the first radio signal and the second radio signal within at least one sending period of radio signals based on the configuration information — S102

FIG. 6

RADIO SIGNAL SENDING METHOD AND APPARATUS

CROSS-REFERENCE TO RELATED APPLICATIONS

This application is a continuation of International Patent Application No. PCT/CN2020/071153, filed on Jan. 9, 2020, which claims priority to Chinese Patent Application No. 201910093559.6, filed on Jan. 30, 2019. The disclosures of the aforementioned applications are hereby incorporated by reference in their entireties.

TECHNICAL FIELD

Embodiments of this application relate to communications technologies, and in particular, to a radio signal sending method and apparatus.

BACKGROUND

As technology advances, autonomous driving vehicles have emerged. It can be said that autonomous driving is a product of ultimate development of an advanced driver assistant system (ADAS). In an autonomous driving architecture, sensors are referred to as eyes of vehicles, including a vision system sensor and a radar system sensor. The radar system sensor may be, for example, a vehicle-mounted millimeter-wave radar, a vehicle-mounted laser radar, or a vehicle-mounted ultrasonic radar.

Because of low costs and mature technologies of a millimeter-wave radar, the millimeter-wave radar has become a main sensor of an autonomous driving system. Many functions of an ADAS on an autonomous driving vehicle are dependent on vehicle-mounted millimeter-wave radars, such as adaptive cruise control (ACC), autonomous emergency braking (AEB), lane change assist (LCA), and blind spot monitoring (BSM). To implement the ACC function, a long-range radar (LRR) and a mid-range radar (MRR) are mounted at a front end of the autonomous driving vehicle. The LRR has a long detection distance, and does not have a high requirement on range resolution. Therefore, a sweeping bandwidth of the LRR is relatively small (for example, 200 megahertz (MHz)). The MRR has a short detection distance, and has a high requirement on the resolution. Therefore, a sweeping bandwidth of the MRR is relatively large (for example, 2 gigahertz (GHz)).

Currently, in some autonomous driving vehicles, a vehicle-mounted front LRR and a vehicle-mounted front MRR are two separate radars. One radar (the LRR radar for short) sends an LRR waveform radar signal to detect a target object within a range of 0 to 250 m. The other radar (the MRR radar for short) sends an MRR waveform radar signal to detect a target object within a range of 0 to 100 m. In such an arrangement manner, the LRR radar receives the MRR waveform radar signal when detecting a target object, and the MRR radar may receive the LRR waveform radar signal when detecting a target object. Consequently, detection results of the target objects are affected, and driving security is endangered.

SUMMARY

Embodiments of this application provide a radio signal sending method and apparatus, to resolve a technical problem, for example, in a scenario in which a conventional vehicle-mounted front LRR and a conventional vehicle-mounted front MRR are two separate radars, radar signals of the two radars interfere with each other, and consequently, detection results of target objects are affected, and driving security is endangered.

According to a first aspect, an embodiment of this application provides a radio signal sending method. The method is applied to a radio signal sending apparatus. A sending period of radio signals includes at least one first data update period and at least one second data update period, the radio signals include a first radio signal and a second radio signal, the first data update period is used to send the first radio signal, the second data update period is used to send the second radio signal, and waveform configurations of the first radio signal and the second radio signal are different. Optionally, the waveform configuration includes at least one of the following: a radio signal class, a radio signal sweeping bandwidth, radio signal duration, or a radio signal center frequency.

The method includes: The radio signal sending apparatus may obtain configuration information. The configuration information is used to indicate a ratio of a quantity of the first data update periods to a quantity of the second data update periods. For example, the ratio of the quantity of the first data update periods to the quantity of the second data update periods meets one of the following: the quantity of the first data update periods is greater than the quantity of the second data update periods; or the quantity of the first data update periods is less than the quantity of the second data update periods; or the quantity of the first data update periods is equal to the quantity of the second data update periods.

Subsequently, the radio signal sending apparatus may transmit the first radio signal and the second radio signal within at least one sending period of the radio signals based on the configuration information.

In the foregoing method, the radio signal sending apparatus may send, based on the ratio that is of the quantity of the first data update periods to the quantity of the second data update periods and that is indicated by the configuration information, the first radio signal within the first data update period in the at least one sending period, and send the second radio signal within the second data update period in the at least one sending period. In this manner, the radio signal sending apparatus can transmit the first radio signal and the second radio signal in different periods of time within one sending period, such that mutual interference between the first radio signal and the second radio signal can be effectively reduced. When the radio signal sending apparatus is disposed on a vehicle or another mobile apparatus, driving security performance can be improved.

In a possible implementation, the ratio of the quantity of the first data update periods to the quantity of the second data update periods is related to a movement scenario. In this manner, the radio signal sending apparatus can adapt to detection requirements of a target object in different movement scenarios.

In a possible implementation, the obtaining the configuration information includes: obtaining first configuration information, where a quantity ratio indicated by the first configuration information represents that the quantity of the first data update periods is greater than the quantity of the second data update periods, and where the first configuration information corresponds to a first movement scenario; or obtaining second configuration information, where the quantity ratio indicated by the second configuration information represents that the quantity of the first data update periods is less than the quantity of the second data update periods, and where the second configuration information corresponds to a second movement scenario.

For example, the first movement scenario is a non-congestion scenario; and/or the second movement scenario is a congestion scenario. In this implementation, if the waveform configuration includes the radio signal sweeping bandwidth, a sweeping bandwidth of the first radio signal is less than a sweeping bandwidth of the second radio signal.

For another example, the first movement scenario is a congestion scenario and/or the second movement scenario is a non-congestion scenario. In this implementation, if the waveform configuration includes the radio signal sweeping bandwidth, a sweeping bandwidth of the first radio signal is greater than a sweeping bandwidth of the second radio signal.

In this manner, the radio signal sending apparatus can adapt to detection requirements of a target object in different movement scenarios.

In a possible implementation, the configuration information may be obtained in any one of the following manners.

Manner 1: determining the configuration information. Optionally, the configuration information is determined based on at least one of the following: a detection result of a target object, a moving speed of the radio signal sending apparatus, or location information of the radio signal sending apparatus.

For example, if the detection result of the target object includes a distance between the radio signal sending apparatus and the target object, the determining the configuration information includes: when the distance between the radio signal sending apparatus and the target object is greater than or equal to a first preset threshold, and/or the moving speed of the radio signal sending apparatus is greater than or equal to a third preset threshold, determining that the configuration information is the first configuration information, where the quantity ratio indicated by the first configuration information represents that the quantity of the first data update periods is greater than the quantity of the second data update periods; or when the distance between the radio signal sending apparatus and the target object is less than or equal to a second preset threshold, and/or the moving speed of the radio signal sending apparatus is less than or equal to a fourth preset threshold, determining that the configuration information is the second configuration information, where the quantity ratio indicated by the second configuration information represents that the quantity of the first data update periods is less than the quantity of the second data update periods. The first preset threshold is greater than the second preset threshold, and the third preset threshold is greater than the fourth preset threshold.

Manner 2: obtaining the configuration information based on first indication information used to indicate a third movement scenario or the configuration information, where a mapping relationship exists between the third movement scenario and the configuration information. Optionally, the first indication information is from a user or the terminal device.

Manner 3: receiving the configuration information from a terminal device or a user, where the configuration information corresponds to a third movement scenario.

In the foregoing manners, the radio signal sending apparatus can flexibly obtain the configuration information indicating the ratio of the quantity of the first data update periods to the quantity of the second data update periods, to expand an application scenario of the foregoing method.

Optionally, the third movement scenario may be the first movement scenario or the second movement scenario. Alternatively, the third movement scenario may be another movement scenario different from the first movement scenario and the second movement scenario. A quantity of movement scenarios is not specifically limited in this application. Each movement scenario has corresponding configuration information.

According to a second aspect, an embodiment of this application provides a radio signal sending apparatus. A sending period of radio signals includes at least one first data update period and at least one second data update period, and the radio signals include a first radio signal and a second radio signal. The apparatus includes: a processing module configured to obtain configuration information, where the configuration information is used to indicate a ratio of a quantity of the first data update periods to a quantity of the second data update periods, the first data update period is used to send the first radio signal, the second data update period is used to send the second radio signal, and waveform configurations of the first radio signal and the second radio signal are different; and optionally, the waveform configuration may include at least one of the following: a radio signal class, a radio signal sweeping bandwidth, radio signal duration, or a radio signal center frequency; and a sending module configured to transmit the first radio signal and the second radio signal within at least one sending period of the radio signals based on the configuration information.

In a possible implementation, the ratio of the quantity of the first data update periods to the quantity of the second data update periods meets one of the following: the quantity of the first data update periods is greater than the quantity of the second data update periods; or the quantity of the first data update periods is less than the quantity of the second data update periods; or the quantity of the first data update periods is equal to the quantity of the second data update periods.

In a possible implementation, the ratio of the quantity of the first data update periods to the quantity of the second data update periods is related to a movement scenario. Optionally, the processing module is configured to obtain first configuration information, where a quantity ratio indicated by the first configuration information represents that the quantity of the first data update periods is greater than the quantity of the second data update periods, and the first configuration information corresponds to a first movement scenario. Alternatively, the processing module is configured to obtain second configuration information, where the quantity ratio indicated by the second configuration information represents that the quantity of the first data update periods is less than the quantity of the second data update periods, and where the second configuration information corresponds to a second movement scenario.

In an example, the first movement scenario is a non-congestion scenario; or the second movement scenario is a congestion scenario. In this example, if the waveform configuration includes the radio signal sweeping bandwidth, a sweeping bandwidth of the first radio signal is less than a sweeping bandwidth of the second radio signal.

In a possible implementation, the processing module is configured to determine the configuration information. Optionally, the configuration information is determined based on at least one of the following: a detection result of a target object, a moving speed of the radio signal sending apparatus, or location information of the radio signal sending apparatus.

For example, if the detection result of the target object includes a distance between the radio signal sending apparatus and the target object, the processing module is configured to: when the distance between the radio signal sending apparatus and the target object is greater than or equal to a first preset threshold, and/or the moving speed of the radio signal sending apparatus is greater than or equal to a third preset threshold, determine that the configuration information is the first configuration information, where the quantity ratio indicated by the first configuration information represents that the quantity of the first data update periods is greater than the quantity of the second data update periods; or the processing module is configured to: when the distance between the radio signal sending apparatus and the target object is less than or equal to a second preset threshold, and/or the moving speed of the radio signal sending apparatus is less than or equal to a fourth preset threshold, determine that the configuration information is the second configuration information, where the quantity ratio indicated by the second configuration information represents that the quantity of the first data update periods is less than the quantity of the second data update periods. The first preset threshold is greater than the second preset threshold, and the third preset threshold is greater than the fourth preset threshold.

In another possible implementation, the processing module is configured to obtain the configuration information based on first indication information used to indicate a third movement scenario or the configuration information, where a mapping relationship exists between the third movement scenario and the configuration information. Optionally, the first indication information is from a user or the terminal device.

In another possible implementation, the processing module is configured to receive configuration information from a terminal device or a user, where the configuration information corresponds to a third movement scenario.

For beneficial effects of the radio signal sending apparatus provided in the second aspect and the possible implementations of the second aspect, refer to beneficial effects brought by the first aspect and the possible implementations of the first aspect. Details are not described herein again.

According to a third aspect, an embodiment of this application provides a radio signal sending apparatus. A sending period of radio signals includes at least one first data update period and at least one second data update period, and the radio signals include a first radio signal and a second radio signal. The apparatus includes: a processor and a memory, where the memory is configured to store computer-executable program code, and the program code includes instructions; and when the processor executes the instructions, the radio signal sending apparatus is enabled to perform the method according to any one of the first aspect and the possible implementations of the first aspect.

According to a fourth aspect, an embodiment of this application provides a communications apparatus, including units, modules, or circuits configured to perform the method according to the first aspect or the possible implementations of the first aspect. The communications apparatus may be a radio signal sending apparatus, or may be a module used in the radio signal sending apparatus, for example, may be a chip used in the radio signal sending apparatus.

According to a fifth aspect, an embodiment of this application provides a chip. The chip stores a computer program, and when the computer program is executed by the chip, the method according to the first aspect or any possible implementation of the first aspect is implemented.

According to a sixth aspect, an embodiment of this application provides a computer program product including instructions. When the computer program product is run on a computer, the computer is enabled to perform the method according to the first aspect or any possible implementation of the first aspect.

According to a seventh aspect, an embodiment of this application provides a computer-readable storage medium, where the computer-readable storage medium stores instructions. When the storage medium is run on a computer, the computer is enabled to perform the method according to the first aspect or any possible implementation of the first aspect.

According to the radio signal sending method and apparatus provided in the embodiments of this application, the radio signal sending apparatus may send, based on the ratio that is of the quantity of the first data update periods to the quantity of the second data update periods and that is indicated by the configuration information, the first radio signal within the first data update period in the at least one sending period, and send the second radio signal within the second data update period in the at least one sending period. In this manner, the radio signal sending apparatus can transmit the first radio signal and the second radio signal in different periods of time within one sending period, such that mutual interference between the first radio signal and the second radio signal can be effectively reduced. When the radio signal sending apparatus is disposed on a vehicle or another mobile apparatus, driving security performance can be improved.

BRIEF DESCRIPTION OF DRAWINGS

FIG. 5 is a schematic diagram of an application scenario associated with an embodiment of this application;

FIG. 6 is a schematic flowchart of a radio signal sending method according to an embodiment of this application;

DESCRIPTION OF EMBODIMENTS

In recent years, an ADAS has played a very important role in an intelligent vehicle. The system uses various sensors mounted on the vehicle to sense, in a driving process of the vehicle, an ambient environment, collect data, identify, detect and track stationary and moving objects, and perform systematic calculation and analysis with reference to map data of a navigator. In this case, a driver is aware of possible danger in advance, and driving comfort and security of the vehicle are effectively improved. Autonomous driving is a product of ultimate development of the ADAS. In an autonomous driving architecture, a sensor layer includes a vision system sensor, for example, an on-board camera, and a radar system sensor, for example, a vehicle-mounted millimeter-wave radar, a vehicle-mounted laser radar, and a vehicle-mounted ultrasonic radar.

A working principle of a radar is to transmit a signal (or referred to as a detection signal), and receive a reflection signal reflected by a target object, to detect information about the target object. The information about the target object may include, for example, at least one of a relative distance, speed, or angle between the target object and a vehicle. In some embodiments, the relative distance, speed, or angle between the target object and the vehicle may also be referred to as a relative distance, speed, or angle between the target object and the radar. It may be understood that the target object herein may be, for example, a person, a vehicle, a stationary object, or a moving object.

Because of low costs and mature technologies of a millimeter-wave radar, the millimeter-wave radar has become a main sensor of an autonomous driving system. Currently, many functions such as ACC, AEB, LCA, and BSM functions of an ADAS on an autonomous driving vehicle are dependent on a vehicle-mounted millimeter-wave radar.

A millimeter wave is an electromagnetic wave with a wavelength ranging from 1 millimeter (mm) to 10 mm, and a corresponding frequency range is 30 GHz to 300 GHz. In this frequency band, millimeter wave-related characteristics are well applicable to the field of vehicles. For example, a large bandwidth, abundant frequency domain resources, and a low antenna sidelobe facilitate imaging or quasi-imaging. Because of a short wavelength, a radar size and an antenna diameter are reduced, and a weight is reduced. A narrow beam is that when antennas have the same size, a millimeter wave beam is much narrower than a microwave beam, such that radar resolution is high. Strong penetration is that capabilities of penetrating smoke, dust, ad fog are stronger compared with these of a laser radar and an optical system, and all-weather work can be implemented.

The following describes and introduces a working principle of a vehicle-mounted radar using a vehicle-mounted millimeter-wave radar.

Figure 1:
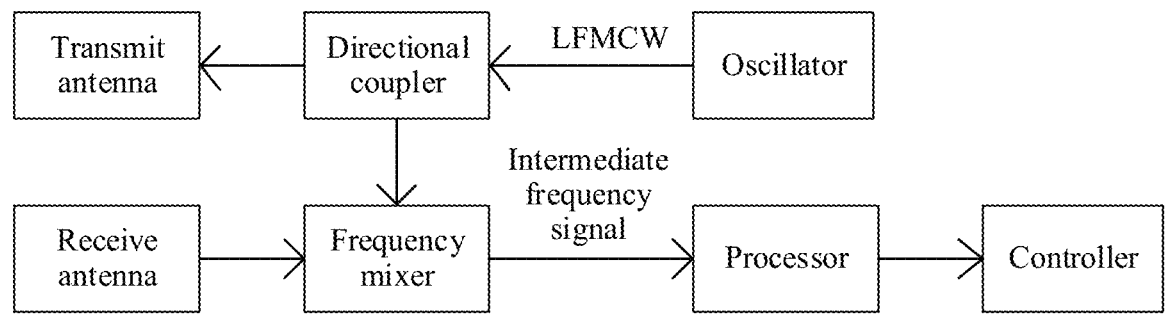
FIG. 1 is a schematic structural diagram of a vehicle-mounted millimeter-wave radar.

FIG. 1 is a schematic structural diagram of a vehicle-mounted millimeter-wave radar. As shown in FIG. 1, the vehicle-mounted millimeter-wave radar usually includes: an oscillator, a transmit antenna, a receive antenna, a frequency mixer, a processor, and the like. A controller shown in FIG. 1 is usually not included in the vehicle-mounted millimeter-wave radar, but is included in a receive end that receives an output signal of the vehicle-mounted millimeter-wave radar. For example, the controller may be located in a vehicle, or may be located in a processing apparatus configured to control driving of the vehicle, or the like. This is not specifically limited.

For example, the vehicle-mounted millimeter-wave radar is a linear frequency modulated continuous wave (LFMCW) radar. The oscillator of the vehicle-mounted millimeter-wave radar generates a millimeter-wave signal (namely, an LFMCW signal) whose frequency linearly increases with time. A linear change herein usually is a linear change within a period. A waveform of the linear frequency modulated continuous wave usually is a sawtooth wave or a triangular wave, or may be another possible waveform, for example, a pulse. A part of the millimeter-wave signal is output to a frequency mixer using a directional coupler and is used as a local-frequency signal, and the other part is transmitted using the transmit antenna.

The vehicle-mounted millimeter-wave radar receives a millimeter-wave signal reflected back by a target object in front of the vehicle using a receive antenna, and is mixed with the local-frequency signal in a frequency mixer to obtain an intermediate frequency (IF) signal. A frequency of the intermediate frequency signal is an intermediate frequency. The intermediate frequency signal includes information about the target object.

The intermediate frequency signal obtained by the frequency mixer is filtered by a low-pass filter (not shown in the figure), amplified, and then sent to the processor. The processor processes the intermediate frequency signal (for example, fast Fourier transform or spectrum analysis may be performed on the signal), to obtain the information about the target object. Finally, the processor outputs a detection result of the target object (namely, the information about the target object) to the controller, such that the controller controls the vehicle based on the detection result of the target object. Usually, based on a configuration of a radar, an intermediate frequency corresponding to a maximum ranging distance is considered to be a maximum intermediate frequency, and a signal whose frequency is greater than the intermediate frequency may be filtered by the low-pass filter.

For example, a waveform of the millimeter-wave signal is a sawtooth wave, and the ranging principle of the vehicle-mounted millimeter-wave radar is described in detail. The ranging principle of a millimeter-wave radar whose signal waveform is another waveform, and the ranging principle of another vehicle-mounted radar are similar. Details are not described herein again.

Figure 2A:
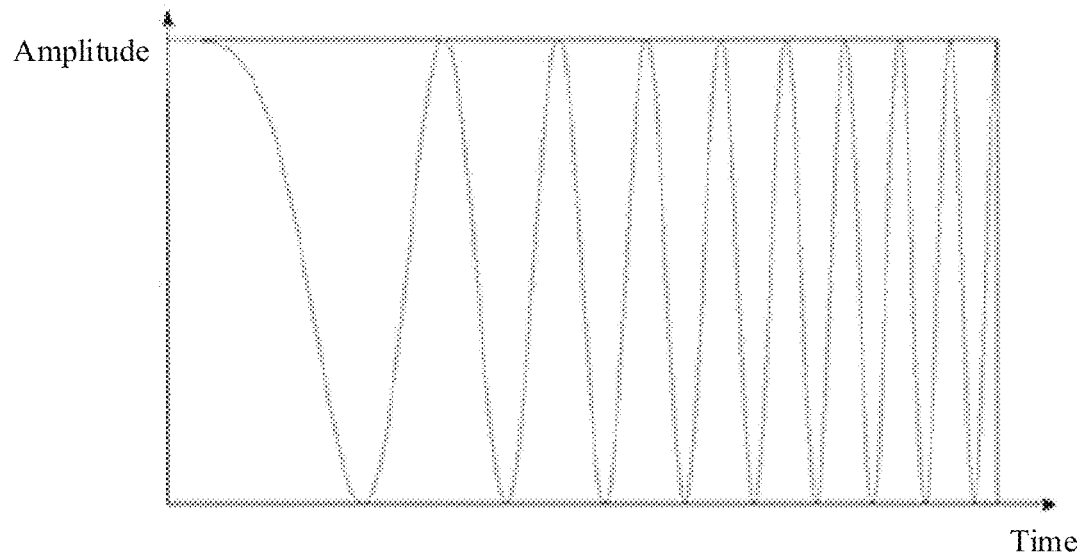
FIG. 2A is a time-amplitude diagram of a linear frequency modulated continuous wave according to an embodiment of this application.
Figure 2B:
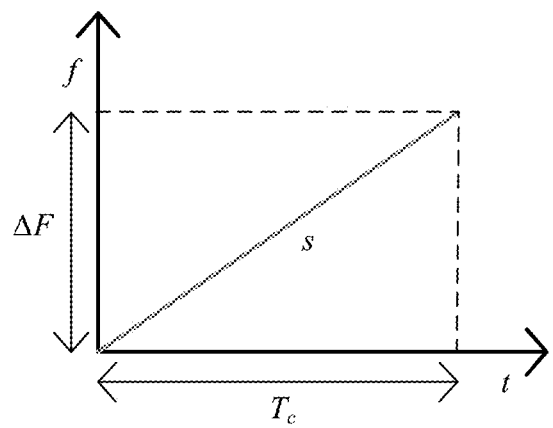
FIG. 2B is a time-frequency diagram of a linear frequency modulated continuous wave according to an embodiment of this application.

FIG. 2A is a time-amplitude diagram of a linear frequency modulated continuous wave according to an embodiment of this application, and FIG. 2B is a time-frequency diagram of a linear frequency modulated continuous wave according to an embodiment of this application. As shown in FIG. 2A and FIG. 2B, the LFMCW increases a bandwidth with a size of $\Delta F$ by a slope s within a time $T_c$. $\Delta F$ may also be referred to as a sweeping bandwidth of a radar signal, namely, a bandwidth occupied by a waveform of the radar signal. It should be noted that the "sweeping bandwidth" is defined for ease of description, and technically is a bandwidth occupied by the waveform of the radar signal. It may be understood that, for a sawtooth wave, $T_c$ is duration of a single LFMCW, namely, duration of one chirp described below.

As described above, the vehicle-mounted millimeter-wave radar transmits a series of millimeter-wave signals (namely, transmit signals) outward using the transmit antenna. After encountering an obstacle (namely, the target object), the millimeter-wave signals are reflected back, and then received by the receive antenna of the vehicle-mounted millimeter-wave radar. In this case, the transmit signals of the vehicle-mounted millimeter-wave radar and the reflection signals (namely, receive signals) received by the vehicle-mounted millimeter-wave radar are of a same shape.

Figure 3:
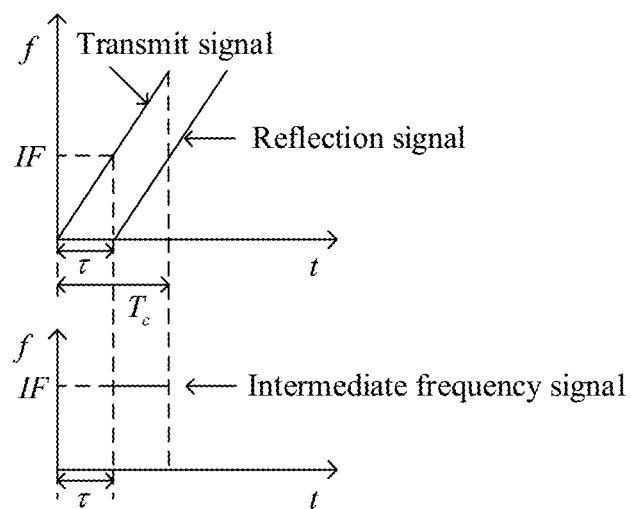
FIG. 3 is a schematic diagram of possible frequency changes of a transmit signal, a receive signal, and an intermediate frequency signal.

FIG. 3 is a schematic diagram of possible frequency changes of a transmit signal, a receive signal, and an intermediate frequency signal. As shown in FIG. 3, the transmit signal $x_1$ may be shown in the following formula (1):

$$x_1 = \sin(\omega_1(t) \cdot t + \varphi_1) \quad (1),$$

where $\omega_1(t)$ is an angular velocity of the transmit signal $x_1$, and where $\varphi_1$ is an initial phase of the transmit signal $x_1$.

The receive signal $x_2$ may be shown in the following formula (2):

$$x_2 = \sin(\omega_2(t) \cdot t + \varphi_2) \quad (2),$$

where $\omega_2(t)$ is an angular velocity of the receive signal $x_2$, and where $\varphi_2$ is an initial phase of the receive signal $x_2$.

A time delay $\tau$ exists between the transmit signal and the receive signal. As shown in FIG. 3, a relationship of a distance d between $\tau$ and the target object (namely, a relative distance between the target object and the vehicle) may be shown in the following formula (3):

$$\tau = \frac{2d}{c}, \quad (3)$$

where c is the speed of light.

The transmit signal and the receive signal are multiplied in the frequency mixer, and are output to be an intermediate frequency (IF) signal $x_{out}$ after passing the low-pass filter, as shown in the following formula (4):

$$x_{out} = \sin[(\omega_1(t) - \omega_2(t)) \cdot t + (\varphi_1 - \varphi_2)] \quad (4).$$

A frequency IF of the intermediate frequency signal $x_{out}$ is a product of the transmit signal slope s and the time delay $\tau$, and is also equal to a difference between a transmit signal frequency and a receive signal frequency. A frequency IF of the intermediate frequency signal $x_{out}$ may be shown in the following formula (5):

$$IF = s * \tau \quad (5).$$

Because $$s = \frac{\Delta F}{T_c},$$

and $\tau = \frac{2d}{c}$, the frequency IF of the intermediate frequency signal $x_{out}$ may be further shown in the following formula (6):

$$IF = \frac{\Delta F}{T_c} * \frac{2d}{c}. \quad (6)$$

Therefore, the distance d to the target object may be shown in the following formula (7):

$$d = \frac{c * T_c}{2\Delta F} * IF. \quad (7)$$

It can be seen from the foregoing derivation that a linear relationship exists between the difference between the transmit signal frequency and the receive signal frequency (namely, the frequency of the intermediate frequency signal) and the time delay $\tau$. The object is farther, the time at which the vehicle millimeter-wave radar receives the reflection signal is later, and the difference between the receive signal frequency and the transmit signal frequency is greater. The distance d to the target object can be determined by determining the frequency IF of the intermediate frequency signal.

It may be understood that, during actual application, the distance d to the target object may also be obtained using a difference between a transmit signal phase and a receive signal phase. That is, the distance d to the target object may be obtained by detecting the frequency or a phase of the intermediate frequency signal. It can be learned from the foregoing that other information about the target object is also included in the frequency of the intermediate frequency signal or the phase of the intermediate frequency signal.

Range resolution is the ability of a vehicle-mounted millimeter-wave radar to distinguish between two or more target objects. When a distance between two target objects is less than a specific distance, the vehicle-mounted millimeter-wave radar cannot distinguish the two target objects. From the foregoing, a one-to-one correspondence relationship exists between the distance and the frequency. To ensure that two target objects with a frequency difference $\Delta f$ can be distinguished, an observation time of a signal of the vehicle-mounted millimeter-wave radar needs to meet the following formula (8):

$$\Delta f > \frac{1}{T_c}, \quad (8)$$

where $T_c$ is duration of a single LFMCW, and may also be referred to as an observation time length.

It can be learned from the foregoing formula (5) that the frequency difference $\Delta f$ may be shown in the following formula (9):

$$\Delta f = s \cdot \frac{2\Delta d}{c}, \quad (9)$$

where $\Delta d$ is a distance between the two target objects, and $$s = \frac{\Delta F}{T_c}.$$

Therefore, after $$s = \frac{\Delta F}{T_c}$$

is substituted to the foregoing formula (9) and transformed, the following formula (10) may be obtained:

$$\Delta d > \frac{C}{2\Delta F}. \quad (10)$$

It can be seen from the above formula (10) that the range resolution of the vehicle-mounted millimeter-wave radar depends on a sweeping bandwidth of the linear frequency modulated continuous wave. The bandwidth is larger, and the range resolution is higher.

That is, the range resolution of the vehicle-mounted radar signal is related to the sweeping bandwidth of the radar signal. Therefore, to implement the ACC function, two vehicle-mounted radars, that is, a long-range radar (LRR) and a mid-range radar (MRR), need to be mounted at a front end of the vehicle. The LRR has a long detection distance, and does not have a high requirement on range resolution. Therefore, a sweeping bandwidth of the LRR is relatively small (for example, 200 MHz). The MRR has a short detection distance, and has a high requirement on the resolution. Therefore, a sweeping bandwidth of the MRR is relatively large (for example, 2 GHz).

For example, the vehicle-mounted radar is the LRR. The vehicle-mounted radar needs at least one chirp signal to complete a distance detection, and needs only two chirp signals to complete a speed detection. To obtain the distance and the speed simultaneously, and to ensure sufficient speed resolution, usually the vehicle-mounted radar may continuously send tens or even hundreds of chirp signals. These tens or hundreds of chirp signals constitute a chirp signal group used to detect at least one of a distance, a speed, an angle, or the like of the target object. Usually, a chirp signal group includes at least two chirp signals, a chirp signal group lasts several milliseconds or tens of milliseconds, and the vehicle-mounted radar outputs a detection result of the target object within a specific data update period. Duration of the chirp signal group is usually less than or equal to the data update period of the vehicle-mounted radar. For example, a chirp signal group lasts 5 milliseconds (ms), a data update period of the vehicle-mounted radar is 50 milliseconds, and the vehicle-mounted radar may send a chirp signal group with the duration of 5 milliseconds every 50 milliseconds.

It should be understood that the $T_c$ described above is a time resource occupied by one chirp, and the duration of the chirp signal group is a time resource occupied by the chirp signal group. At least one chirp signal group exists within each data update period, the duration of the chirp signal group is usually less than or equal to the data update period of the vehicle-mounted radar, and the radar outputs, within each data update period, a detection result that is of the target object and that is obtained based on a chirp signal group.

In the conventional technology, the vehicle-mounted LRR and the vehicle-mounted MRR are two independently disposed radars, and it may be considered that, when the vehicle-mounted LRR and the vehicle-mounted MRR are respectively implemented using different radars, the LRR and the MRR are implemented using two radars. One vehicle-mounted radar (referred to as an LRR radar for short) sends an LRR waveform radar signal (referred to as an LRR signal for short) to detect a target object within a range of 0 to 250 m. Another vehicle-mounted radar (referred to as an MRR radar for short) sends an MRR waveform radar signal (referred to as an MRR signal for short) to detect a target object within the range of 0 to 100 m.

Figure 4:
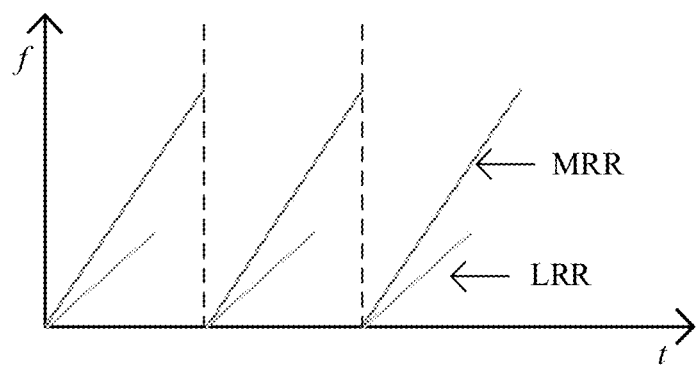
FIG. 4 is a schematic waveform diagram in which an LRR and an MRR are respectively implemented using different radars in the conventional technology.

FIG. 4 is a schematic waveform diagram in which an LRR and an MRR are respectively implemented using different radars in the conventional technology. As shown in FIG. 4, if the LRR radar and the MRR radar simultaneously send different waveforms, the LRR radar may receive the MRR waveform radar signal when detecting the target object, and the MRR radar may receive the LRR waveform radar signal when detecting the target object. Consequently, the LRR radar and the MRR radar may interfere with each other when working, detection on the target object is affected, and driving security is endangered.

In consideration of the foregoing problem, an embodiment of this application provides a radio signal sending method, which is performed by a radio signal sending apparatus. A sending period of radio signals of the radio signal sending apparatus includes data update periods for sending different radio signals. The radio signal sending apparatus is configured with a ratio between quantities of the data update periods for sending the different radio signals, such that the radio signal sending apparatus can transmit a first radio signal and a second radio signal in different periods of time within the sending period. Therefore, mutual interference between the first radio signal and the second radio signal can be effectively reduced, and driving security performance can be improved. It may be understood that the radio signal sending apparatus provided in this embodiment of this application may send at least two different radio signals such as the first radio signal and the second radio signal.

The radio signal sending apparatus described herein may be any device capable of sending radio signals, for example, the radio signal sending apparatus may be a radar. The radar herein includes, but is not limited to, a vehicle-mounted radar (for example, the vehicle-mounted millimeter-wave radar, vehicle-mounted laser radar, and vehicle-mounted ultrasonic radar described above), and may also be applicable to another scenario in which the radar is used. It may be understood that when the radio signal sending apparatus is a radar, the radio signals are radar signals. In a scenario in which the radio signal sending apparatus is the radar, the radio signals are not limited to an LRR signal and an MRR signal, and signal classes are not specifically limited. For ease of describing the solution, the following mainly uses the LRR signal and the MRR signal as an example for description.

FIG. 5 is a schematic diagram of an application scenario associated with an embodiment of this application. As shown in FIG. 5, for example, a radio signal sending apparatus is a radar. The radar in the embodiment of this application may be mounted in a motor vehicle, an unmanned aerial vehicle, a railcar, a bicycle, a signal lamp, a speed measurement apparatus, a base station, or the like. A mounting position and a function of the radar are not limited in this embodiment of this application. This embodiment of this application is applicable to a radar system between vehicles, a radar system between a vehicle and another apparatus such as the unmanned aerial vehicle, or a radar system between other apparatuses. In addition, a waveform used by the radar is not limited in this embodiment of this application. For example, the waveform used by the radar may be a sawtooth wave, a triangular wave, a pulse wave, a stepped frequency-modulated continuous wave, or the like.

The following describes the technical solutions of this embodiment of this application in detail with reference to example embodiments. The following several example embodiments may be combined with each other, and a same or similar concept or process may not be described repeatedly in some embodiments.

FIG. 6 is a schematic flowchart of a radio signal sending method according to an embodiment of this application. The method in this embodiment of this application may be applied to a radio signal sending apparatus. A sending period of radio signals of the radio signal sending apparatus includes at least one first data update period and at least one second data update period. The radio signals include a first radio signal and a second radio signal. The first data update period is used to send the first radio signal, and the second data update period is used to send the second radio signal.

It should be understood that the foregoing sending period of the radio signals may be a fixed value Z, and because of the fixed value Z, the sending period of the radio signals can meet any quantity ratio that can be configured in configuration information. Alternatively, the foregoing sending period of the radio signals is related to a ratio that is of a quantity of the first data update periods to a quantity of the second data update periods and that is configured in the configuration information. In other words, the sending period of the radio signals may change with a change of the ratio of the quantity of the first data update periods to the quantity of the second data update periods.

For example, if one data update period is 50 milliseconds, and the ratio that is of the quantity of the first data update periods to the quantity of the second data update periods and that is configured in the configuration information is 1:2. In this case, the sending period of the radio signals may be 150 milliseconds, 300 milliseconds, 450 milliseconds, or the like. If the ratio that is of the quantity of the first data update periods to the quantity of the second data update periods and that is configured in the configuration information is 1:3, the sending period of the radio signals may be 200 milliseconds, 400 milliseconds, 600 milliseconds, or the like.

That is, compared with duration of a conventional data update period, duration occupied by the sending period in this embodiment of this application is duration occupied by at least two data update periods. In other words, the duration occupied by the sending period in this embodiment of this application is usually an integer multiple of the data update period. It should be noted herein that within one or more sending periods of the radio signals or within each sending period, quantities of first data update periods and second data update periods and a ratio of the quantity of the first data update periods to the quantity of the second data update periods may be the same or different. This is not specifically limited herein.

Waveform configurations of the first radio signal and the second radio signal are different. Optionally, the waveform configuration herein may include at least one of the following: a radio signal class, a radio signal sweeping bandwidth, radio signal duration, or a radio signal center frequency.

It should be understood that the foregoing radio signal class includes, but is not limited to, a linear frequency modulated continuous wave signal, a stepped frequency-modulated continuous wave signal, a single frequency signal, a pulse signal, an orthogonal frequency-division multiplexing (OFDM) signal, and the like. The foregoing radio signal sweeping bandwidth is a bandwidth occupied by a radio signal waveform, and using a linear frequency modulated continuous wave as an example, it is a frequency domain resource occupied by a single frequency-modulated continuous wave signal. The radio signal duration is duration of one radio signal, and using a linear frequency modulated continuous wave as an example, it is $T_c$ and is duration of a single frequency-modulated continuous wave signal, namely, the duration of the single chirp signal. The radio signal center frequency is used to represent a frequency domain location in which the radio signal is located, and using a vehicle-mounted radar as an example, the center frequency may be 24 GHz, 77 GHz, or the like. Optionally, the radio signal center frequency may be replaced with another frequency of the radio signal, where the other frequency can represent the frequency domain location in which the radio signal is located.

For example, the radio signal sending apparatus is a radar. The first radio signal may be, for example, an LRR signal, and the second radio signal may be, for example, an MRR signal. Alternatively, the first radio signal may be, for example, an MRR signal, and the second radio signal may be, for example, an LRR signal.

As shown in FIG. 6, the method includes the following steps.

S101: Obtain configuration information. The configuration information is used to indicate a ratio of a quantity of the first data update periods to a quantity of the second data update periods.

S102: Transmit the first radio signal and the second radio signal within at least one sending period of the radio signals based on the configuration information.

For example, the ratio of the quantity of the first data update periods to the quantity of the second data update periods in one sending period of the radio signals meets one of the following.

(1): The quantity of first data update periods is greater than the quantity of the second data update periods. That is, the ratio of the quantity of the first data update periods to the quantity of the second data update periods is N:M, where N is greater than 1, where M is greater than or equal to 1, and where M is less than N. For example, the ratio is any one of 2:1, 3:1, 4:1, 5:1, 3:2, 5:3, or the like.

(2): The quantity of first data update periods is less than the quantity of the second data update periods. That is, the ratio of the quantity of the first data update periods to the quantity of the second data update periods is X:Y, where Y is greater than 1, where X is greater than or equal to 1, and where X is less than Y. For example, the ratio is any one of 1:2, 1:3, 1:4, 1:5, 3:4, 2:7, or the like.

(3): The quantity of first data update periods is equal to the quantity of the second data update periods. That is, the ratio of the quantity of the first data update periods to the quantity of the second data update periods is 1:1.

For example, the radio signal sending apparatus is a radar, the first radio signal is an LRR signal, and the second radio signal is an MRR signal, where the first data update period is used to send the LRR signal and detect a target object based on the sent LRR signal, and where the first data update period is used to send the MRR signal and detect the target object based on the sent MRR signal.

Figure 7A:
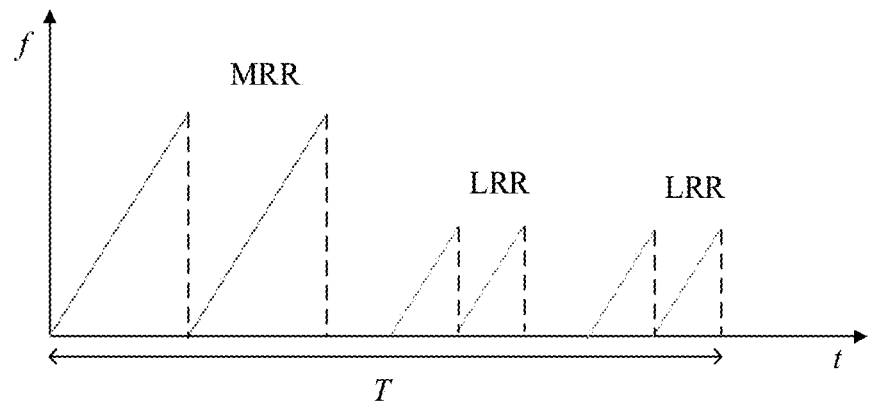
FIG. 7A is a schematic diagram of a data update period quantity ratio according to an embodiment of this application.

FIG. 7A is a schematic diagram of a data update period quantity ratio according to an embodiment of this application. As shown in FIG. 7A, assuming that a ratio of a quantity of the first data update periods to a quantity of the second data update periods is 2:1, the quantity of the first data update periods and the quantity of the second data update periods in one sending period T may be shown in FIG. 7A.

Figure 7B:
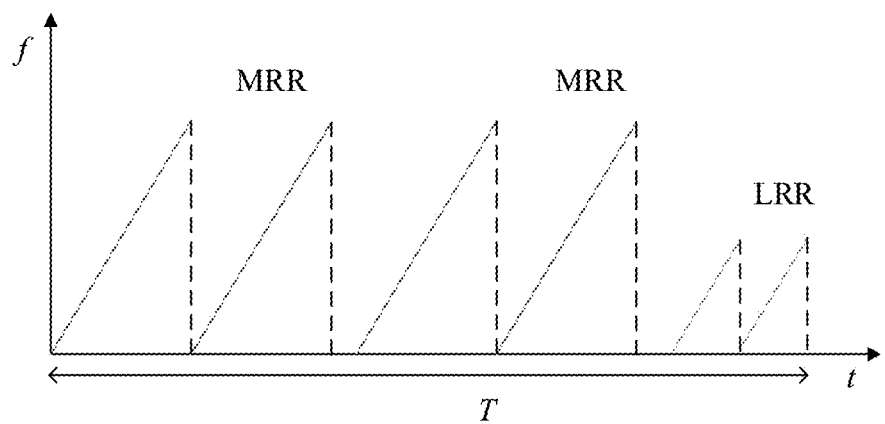
FIG. 7B is a schematic diagram of another data update period quantity ratio according to an embodiment of this application.

FIG. 7B is a schematic diagram of another data update period quantity ratio according to an embodiment of this application. As shown in FIG. 7B, assuming that a ratio of a quantity of the first data update periods to a quantity of the second data update periods is 1:2, the quantity of the first data update periods and the quantity of the second data update periods in one sending period T may be shown in FIG. 7B.

Figure 7C:
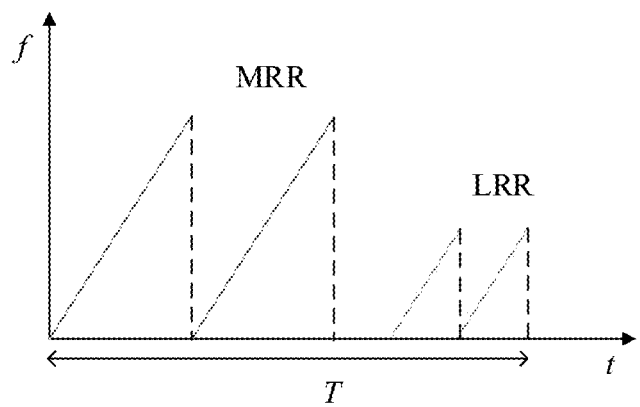
FIG. 7C is a schematic diagram of still another data update period quantity ratio according to an embodiment of this application.

FIG. 7C is a schematic diagram of still another data update period quantity ratio according to an embodiment of this application. As shown in FIG. 7C, assuming that a ratio of a quantity of the first data update periods to a quantity of the second data update periods is 1:1, the quantity of the first data update periods and the quantity of the second data update periods in one sending period T may be shown in FIG. 7C.

It should be understood that the first data update periods and the second data update periods shown in FIG. 7A to FIG. 7C are merely examples, and are used to describe the ratio of the quantity of the first data update periods to the quantity of the second data update periods in one sending period T. This does not constitute a limitation on the quantity of the first data update periods and the quantity of the second data update periods in one sending period T. For example, when the ratio of the quantity of the first data update periods to the quantity of the second data update periods in one sending period T is 2:1, one sending period T may include two first data update periods and one second data update period, or may include four first data update periods and two second data update periods, or the like. The quantity of first data update periods and the quantity of the second data update periods in one sending period T may be determined based on duration occupied by the sending period T, duration occupied by the first data update period, duration occupied by the second data update period, and the ratio of the quantity of the first data update periods to the quantity of the second data update periods. Details are not described herein again.

In the embodiments of this application, the radio signal sending apparatus may send, based on the ratio that is of the quantity of the first data update periods to the quantity of the second data update periods and that is indicated by the configuration information, the first radio signal within the first data update period in the at least one sending period, and send the second radio signal within the second data update period in the at least one sending period. In this manner, the radio signal sending apparatus can transmit the first radio signal and the second radio signal in different periods of time within one sending period, such that mutual interference between the first radio signal and the second radio signal can be effectively reduced. When the radio signal sending apparatus is disposed on a vehicle, driving security performance can be improved.

For example, the radio signal sending apparatus is a radar, the first radio signal is an LRR signal, and the second radio signal is an MRR signal. When the method in the embodiments of this application is applied, the radar may send, based on to the obtained configuration information, the LRR signal within a first data update period in at least one sending period, and the MRR signal within a second data update period in the at least one sending period, such that the radar may transmit the LRR signal and the MRR signal in different periods of time within one sending period. Because the MRR signal and the LRR signal are transmitted in different periods of time, the radar does not receive the MRR signal when detecting the target object based on the LRR signal, and does not receive the LRR signal when detecting the target object based on the MRR signal. Therefore, mutual interference between the LRR signal and the MRR signal is effectively reduced, and driving security performance is improved.

It can be learned from the foregoing description that a ratio of a quantity of the first data update periods to a quantity of the second data update periods in one sending period of radio signals can be configured using configuration information. In other words, different ratios of quantities of first data update periods to quantities of second data update periods are configured in different configuration information. For example, when the configuration information is first configuration information, a quantity ratio indicated by the first configuration information represents that the quantity of the first data update periods is greater than the quantity of the second data update periods. Alternatively, when the configuration information is second configuration information, a quantity ratio indicated by the second configuration information represents that the quantity of the first data update periods is less than the quantity of the second data update periods. Alternatively, when the configuration information is third configuration information, a quantity ratio indicated by the third configuration information represents that the quantity of the first data update periods is equal to the quantity of the second data update periods.

That is, the radio signal sending apparatus may obtain the first configuration information, such that a quantity of first radio signals sent by the radio signal sending apparatus within at least one sending period is greater than a quantity of second radio signals. Alternatively, the radio signal sending apparatus may obtain the second configuration information, such that a quantity of first radio signals sent by the radio signal sending apparatus within at least one sending period is less than a quantity of second radio signals. Alternatively, the radio signal sending apparatus may obtain the third configuration information, such that a quantity of first radio signals sent by the radio signal sending apparatus within at least one sending period is equal to a quantity of second radio signals.

It should be understood that, when the radio signal sending apparatus is in a non-congestion scenario, there are more target objects that are relatively far from the radio signal sending apparatus, and the radio signal sending apparatus has more requirements for detecting radio signals of a long distance. Alternatively, when the radio signal sending apparatus is in a congestion scenario, there are more target objects that are relatively close to the radio signal sending apparatus, and the radio signal sending apparatus has more requirements for detecting radio signals of a short distance. Therefore, in a possible implementation, the foregoing different configuration information may correspond to different movement scenarios. In other words, the ratio of the quantity of the first data update periods to the quantity of the second data update periods is related to a movement scenario. The movement scenario described herein may include, but is not limited to, for example, the foregoing non-congestion scenario, the congestion scenario, and the like. For example, the non-congestion scenario may include a highway driving scenario, an urban driving scenario, and the like. The congestion scenario may include various traffic congestion scenarios (for example, an urban traffic congestion scenario, and a highway traffic congestion scenario), a dense population scenario, and the like.

For example, the first configuration information may correspond to a first movement scenario, and the second configuration information may correspond to a second movement scenario. For example, the first movement scenario is a non-congestion scenario, and/or the second movement scenario is a congestion scenario. In this example, a sweeping bandwidth of the first radio signal may be less than a sweeping bandwidth of the second radio signal. Alternatively, for example, the first movement scenario is a congestion scenario, and/or the second movement scenario is a non-congestion scenario. In this example, a sweeping bandwidth of the first radio signal may be greater than a sweeping bandwidth of the second radio signal.

Figure 8A:
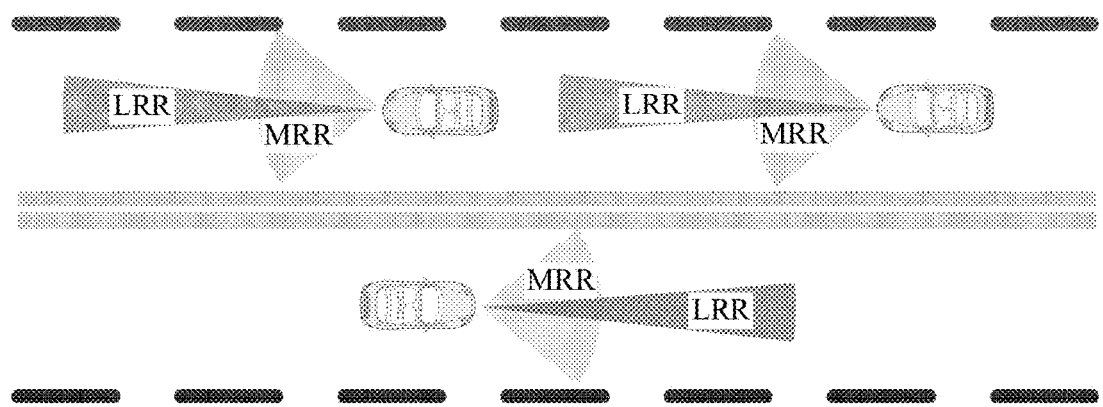
FIG. 8A shows a movement scenario according to an embodiment of this application.
Figure 8B:
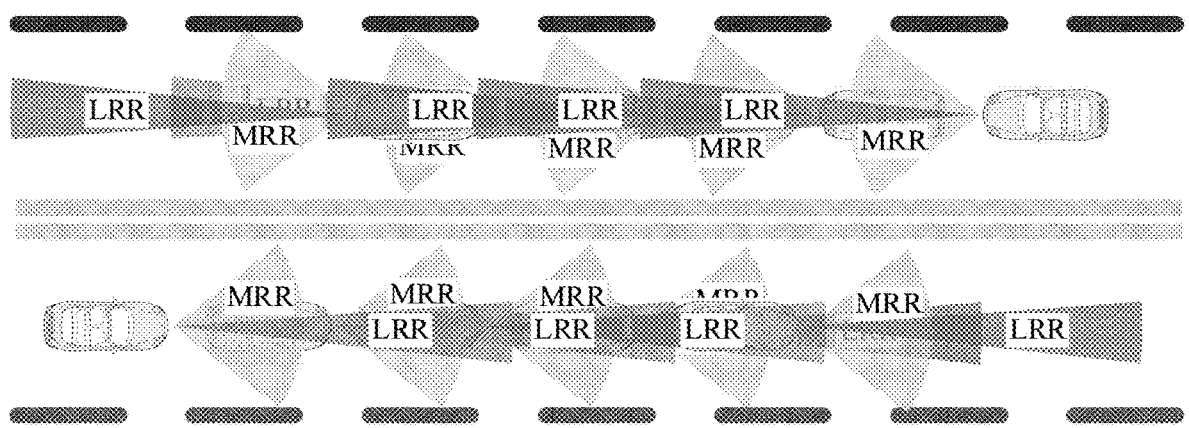
FIG. 8B shows another movement scenario according to an embodiment of this application.

FIG. 8A shows a movement scenario according to an embodiment of this application, and FIG. 8B shows another movement scenario according to an embodiment of this application. For example, a radio signal sending apparatus is a vehicle-mounted radar, a first radio signal is an LRR signal, and a second radio signal is an MRR signal whose sweeping bandwidth is greater than that of the LRR signal. When the method in the embodiments of this application is applied, as shown in FIG. 8A, when the vehicle-mounted radar is in a non-congestion scenario, a vehicle distance is relatively long, such that it is further required that an LRR implements an ACC function. Therefore, the vehicle-mounted radar may obtain first configuration information, such that the vehicle-mounted radar can send LRR signals in more periods of time within a sending period, and can have more opportunities to detect long-distance target objects while simultaneously detecting short-distance target objects.

As shown in FIG. 8B, when the vehicle-mounted radar is in a congestion scenario, a vehicle distance is relatively short, such that it is further required that an MRR implements a short-distance vehicle detection and collision avoidance. Therefore, the vehicle-mounted radar may obtain second configuration information, such that the vehicle-mounted radar can send MRR signals in more periods of time within a sending period, and can have more opportunities to detect short-distance target objects while simultaneously detecting long-distance target objects.

In this manner, the vehicle-mounted radar can adapt to detection requirements of target objects in different movement scenarios.

Optionally, the vehicle-mounted radar can always transmit, in a movement scenario, radar signals based on a quantity ratio indicated by configuration information corresponding to the movement scenario until the scenario changes.

In a possible implementation, when implementing the foregoing method embodiment, a radio signal sending apparatus may obtain configuration information in any one of the following manners.

Manner 1: The radio signal sending apparatus determines the configuration information.

In a possible implementation, the radio signal sending apparatus may determine the configuration information based on at least one of the following: a detection result of a target object, a moving speed of the radio signal sending apparatus, or location information of the radio signal sending apparatus.

The detection result of the target object herein includes at least one of the following: a distance, a speed, and an angle between the target object and the radio signal sending apparatus. It should be understood that any one of a distance, a speed, or an angle between the target object and the radio signal sending apparatus may reflect a distance between the target object and the radio signal sending apparatus. For how to obtain a detection result of the target object, refer to the foregoing description of the vehicle-mounted millimeter-wave radar, an implementation principle similar thereto, and details are not described herein again.

The moving speed of the radio signal sending apparatus and the location information of the radio signal sending apparatus may be detected by the radio signal sending apparatus, or may be obtained by another sensor of a carrier of the radio signal sending apparatus and transmitted to the radio signal sending apparatus, or may be sent to the radio signal sending apparatus by another terminal device that is located in a same movement scenario as the radio signal sending apparatus. For example, if the radio signal sending apparatus is a vehicle-mounted radar, the moving speed of the radio signal sending apparatus and the location information of the radio signal sending apparatus may be detected by a vehicle-mounted sensor and sent to the radio signal sending apparatus by a vehicle-mounted terminal, or may be detected by a terminal device of a user who drives a vehicle and sent to the radio signal sending apparatus by a vehicle-mounted terminal, or the like. The moving speed of the radio signal sending apparatus and the location information of the radio signal sending apparatus are not limited in this embodiment of this application.

The following uses an example in which the detection result of the target object includes the distance between the radio signal sending apparatus and the target object for description.

It is assumed that a sweeping bandwidth of the first radio signal is less than a sweeping bandwidth of the second radio signal, the movement scenario includes a non-congestion scenario and a congestion scenario, the non-congestion scenario corresponds to the foregoing first configuration information and the foregoing third configuration information, and the congestion scenario corresponds to the foregoing second configuration information. In this scenario, when the detection result of the target object includes the distance between the radio signal sending apparatus and the target object, the radio signal sending apparatus may determine the configuration information in the following manners.

When the distance between the radio signal sending apparatus and the target object is greater than or equal to a first preset threshold, and/or the moving speed of the radio signal sending apparatus is greater than or equal to a third preset threshold, it indicates that the radio signal sending apparatus may be in a non-congestion scenario in which the radio signal sending apparatus moves at a high speed. In this case, the radio signal sending apparatus further requires the first radio signal with a small sweeping bandwidth and a long detection distance. Therefore, the radio signal sending apparatus may determine that the configuration information is the first configuration information. Optionally, the radio signal sending apparatus may further determine the configuration information with reference to the location information of the radio signal sending apparatus. For example, when the distance between the radio signal sending apparatus and the target object is greater than or equal to the first preset threshold, and/or the moving speed of the radio signal sending apparatus is greater than or equal to the third preset threshold, and the location information of the radio signal sending apparatus represents that the radio signal is on a highway, the radio signal sending apparatus may determine that the configuration information is the first configuration information.

Alternatively, when the distance between the radio signal sending apparatus and the target object is less than or equal to a second preset threshold, and/or the moving speed of the radio signal sending apparatus is less than or equal to a fourth preset threshold, it indicates that the radio signal sending apparatus may be in a congestion scenario. In this case, the radio signal sending apparatus further requires the second radio signal with a great sweeping bandwidth and a short detection distance. Therefore, the radio signal sending apparatus may determine that the configuration information is the second configuration information. Optionally, the radio signal sending apparatus may further determine the configuration information with reference to the location information of the radio signal sending apparatus. For example, when the distance between the radio signal sending apparatus and the target object is less than or equal to the second preset threshold, and/or the moving speed of the radio signal sending apparatus is less than or equal to the fourth preset threshold, and the location information of the radio signal sending apparatus represents that the radio signal is on a non-highway, the radio signal sending apparatus may determine that the configuration information is the second configuration information.

Alternatively, when the distance between the radio signal sending apparatus and the target object is between a first preset threshold and a second preset threshold, and/or the moving speed of the radio signal sending apparatus is between a third preset threshold and a fourth preset threshold, it indicates that the radio signal sending apparatus may be in a non-congestion scenario in which the radio signal sending apparatus moves at a low speed. In this case, the radio signal sending apparatus has a similar requirement on the two radio signals. Therefore, the radio signal sending apparatus may determine that the configuration information is the foregoing third configuration information. Optionally, the radio signal sending apparatus may further determine the configuration information with reference to the location information of the radio signal sending apparatus. For example, when the distance between the radio signal sending apparatus and the target object is between the first preset threshold and the second preset threshold, and/or the moving speed of the radio signal sending apparatus is between the third preset threshold and the fourth preset threshold, and the location information of the radio signal sending apparatus represents that the radio signal is on a non-highway, the radio signal sending apparatus may determine that the configuration information is the third configuration information.

The first preset threshold is greater than the second preset threshold, and the third preset threshold is greater than the fourth preset threshold. Specific values of these preset thresholds may be set based on actual requirements.

Optionally, in some embodiments, the radio signal sending apparatus may further determine the configuration information based on only the location information of the radio signal sending apparatus. For example, when the location information of the radio signal sending apparatus represents that the radio signal is on a highway, the radio signal sending apparatus may determine that the configuration information is the first configuration information. Alternatively, when the location information of the radio signal sending apparatus represents that the radio signal is on a non-highway, the radio signal sending apparatus may determine that the configuration information is the second configuration information.

It should be understood that, when the radio signal sending apparatus is disposed in the vehicle, the radio signal sending apparatus may further combine detection results of other sensors of the vehicle when determining the configuration information. For example, when a moving speed of the vehicle is less than or equal to the second preset threshold, and the radio signal sending apparatus and a vehicle-mounted camera output a large quantity of target vehicles that are very close to the vehicle, it indicates that the vehicle currently is in a congestion scenario. In this case, the radio signal sending apparatus may determine to use the second configuration information. Therefore, the radio signal sending apparatus may send the first radio signal and the second radio signal in different periods of time within the sending period based on the second configuration information. Alternatively, when a moving speed of the vehicle is greater than the first preset threshold, a speed of a target vehicle output by the radio signal sending apparatus and a vehicle-mounted camera is also relatively fast, the vehicle is located on a highway through positioning of a vehicle-mounted GPS, and the like, it indicates that the vehicle currently is in a non-congestion scenario in which the vehicle moves at a high speed. In this case, the radio signal sending apparatus may determine to use the first configuration information. Therefore, the radio signal sending apparatus may send the first radio signal and the second radio signal in different periods within the sending period based on the first configuration information. In the foregoing manner, the radio signal sending apparatus can automatically adapt to detection requirements of the target objects in different movement scenarios.

Manner 2: The radio signal sending apparatus obtains the configuration information based on first indication information used to indicate a third movement scenario or the configuration information.

For example, the radio signal sending apparatus is disposed in a vehicle. In this case, the first indication information may be, for example, autonomous driving function information that can indirectly represent the third movement scenario or the configuration information. During implementation, after receiving the first indication information input by the user, a vehicle-mounted terminal may send the first indication information to the radio signal sending apparatus.

It should be understood that the third movement scenario herein may be understood as a movement scenario in which the radio signal sending apparatus is currently located, and the movement scenario may be, for example, the foregoing first movement scenario or the second movement scenario. The first movement scenario is a non-congestion scenario, and the second movement scenario is a congestion scenario, or the first movement scenario is a congestion scenario, and the second movement scenario is a non-congestion scenario. Alternatively, the third movement scenario may be another movement scenario different from the first movement scenario and the second movement scenario. A quantity of movement scenarios is not specifically limited in this application. Each movement scenario has corresponding configuration information.

For example, a sweeping bandwidth of the first radio signal may be less than a sweeping bandwidth of the second radio signal. In this case, when the autonomous driving function information of the vehicle indicates that a low-speed vehicle following function is turned on, it indicates that the radio signal sending apparatus is currently in a congestion scenario, and there are more target objects that are closer to the radio signal sending apparatus. In this case, the radio signal sending apparatus further requires the second radio signal with a great sweeping bandwidth and a short detection distance. Therefore, the radio signal sending apparatus may determine that the configuration information is the second configuration information. Alternatively, when the autonomous driving function information of the vehicle indicates that an ACC function is turned on, it indicates that the radio signal sending apparatus is currently in a non-congestion scenario, and there are more target objects that are far from the radio signal sending apparatus. In this case, the radio signal sending apparatus further requires the first radio signal with a small sweeping bandwidth and a long detection distance. Therefore, the radio signal sending apparatus may determine that the configuration information is the first configuration information.

In a possible implementation, the radio signal sending apparatus may preset a mapping relationship between a movement scenario and configuration information. Therefore, the radio signal sending apparatus may determine the indicated third movement scenario based on the first indication information, and then determine the configuration information based on the determined third movement scenario and the mapping relationship between the movement scenario and the configuration information. For example, the foregoing mapping relationship between the movement scenario and the configuration information may be shown in the following Table 1.

TABLE 1

| Sequence number | Movement scenario | Configuration information |
|---|---|---|
| 1 | Movement scenario 1 | Configuration information 1 |
| 2 | Movement scenario 2 | Configuration information 2 |
| 3 | Movement scenario 3 | Configuration information 3 |
| ... | ... | ... |
| P | Movement scenario P | Configuration information P |

It should be understood that Table 1 is merely an example. In some embodiments, some movement scenarios may correspond to same configuration information.

In another possible implementation, the radio signal sending apparatus may preset a mapping relationship between the first indication information and the configuration information. Therefore, the radio signal sending apparatus may determine the configuration information based on the first indication information and the mapping relationship between the first indication information and the configuration information. For example, the foregoing mapping relationship between the first indication information and the configuration information may be shown in the following Table 2.

TABLE 2

| Sequence number | First indication information | Configuration information |
|---|---|---|
| 1 | First indication information 1 | Configuration information 1 |
| 2 | First indication information 2 | Configuration information 2 |
| 3 | First indication information 3 | Configuration information 3 |
| ... | ... | ... |
| P | First indication information P | Configuration information P |

It should be understood that Table 2 is merely an example. In some embodiments, some pieces of the first indication information may correspond to same configuration information.

Manner 3: The radio signal sending apparatus receives the configuration information from a terminal device or a user, where the configuration information corresponds to a third movement scenario.

When the configuration information received by the radio signal sending apparatus is from the user, the configuration information may be input by the user to the radio signal sending apparatus. During implementation, the radio signal sending apparatus may be provided with a user interface for the user to input configuration information, such that the user can input the configuration information using the user interface. For how to input the configuration information using the user interface, refer to the conventional technology. Alternatively, the radio signal sending apparatus may be provided with a plurality of keys, and each key is configured to trigger different configuration information, such that the user triggers, by pressing a key, to input configuration information to the radio signal sending apparatus. Alternatively, the radio signal sending apparatus may be provided with a microphone, such that the user inputs configuration information to the radio signal sending apparatus through a voice.

When the configuration information received by the radio signal sending apparatus is from the terminal device, the terminal device may be a terminal device in a same movement scenario as the radio signal sending apparatus. For example, the radio signal sending apparatus is disposed in a vehicle. The terminal device may be, for example, a vehicle-mounted terminal, or a terminal device that is used by a user driving the vehicle and that can communicate with the radio signal sending apparatus.

During implementation, the terminal device may receive the configuration information input by the user, and send the configuration information to a radar signal sending apparatus, or the terminal device may determine the configuration information by the terminal device in a first manner, that is, a manner in which the radio signal sending apparatus determines the configuration information, and send the determined configuration information to the radio signal sending apparatus, or the like.

For example, the radar signal sending apparatus is a vehicle-mounted radar, the first radio signal is an LRR, the second radio signal is an MRR, the first movement scenario is a non-congestion scenario, the first movement scenario corresponds to the first configuration information, a quantity ratio indicated by the first configuration information is 2:1, the second movement scenario is a congestion scenario, the second movement scenario corresponds to the second configuration information, and a quantity ratio indicated by the second configuration information is 1:3. In this case, the following describe how the vehicle-mounted radar sends a radar signal using several examples.

Example 1: The vehicle-mounted radar obtains a detection result of a target object, and the detection result of the target object includes a distance between the target object and the radio signal sending apparatus. The vehicle-mounted radar determines configuration information based on the detection result of the target object and a moving speed of a vehicle.

For example, when the distance between the vehicle-mounted radar and the target object is greater than or equal to a first preset threshold, and/or a moving speed of the vehicle-mounted radar is greater than or equal to a third preset threshold, it indicates that the vehicle-mounted radar may be in a non-congestion scenario in which the vehicle-mounted radar moves at a high speed, that is, the vehicle may be in a non-congestion scenario in which the vehicle moves at a high speed. In this case, the vehicle-mounted radar further requires an LRR signal with a small sweeping bandwidth and a long detection distance. Therefore, the vehicle-mounted radar may determine that the configuration information is the first configuration information. Subsequently, the vehicle-mounted radar may send LRR signals and MRR signals in different periods of time within at least one sending period automatically based on a quantity ratio of 2:1, such that the LRR signals are sent more than the MRR signals within the sending period. Therefore, the vehicle-mounted radar has more time to use the LRR signals for target detection.

Alternatively, when the distance between the vehicle-mounted radar and the target object is less than or equal to a second preset threshold, and/or a moving speed of the vehicle-mounted radar is less than or equal to a fourth preset threshold, it indicates that the vehicle-mounted radar may be in a congestion scenario, that is, the vehicle may be in the congestion scenario. In this case, the vehicle-mounted radar further requires an MRR signal with a great sweeping bandwidth and a short detection distance. Therefore, the vehicle-mounted radar may determine that the configuration information is the second configuration information. Subsequently, the vehicle-mounted radar may send LRR signals and MRR signals in different periods of time within at least one sending period automatically based on a quantity ratio of 1:3, such that the MRR signals are sent more than the LRR signals within the sending period. Therefore, the vehicle-mounted radar has more time to use the MRR signals for target detection.

Example 2: The vehicle-mounted radar receives first indication information from a vehicle-mounted terminal, and determines configuration information based on the first indication information.

When autonomous driving function information of a vehicle indicates that a low-speed vehicle following function is turned on, it indicates that the vehicle-mounted radar is currently in a congestion scenario, and there are more target objects that are closer to the vehicle-mounted radar, that is, more target objects are closer to the vehicle. In this case, the vehicle-mounted radar further requires an MRR signal with a great sweeping bandwidth and a short detection distance. Therefore, the vehicle-mounted radar may determine that the configuration information is the second configuration information. Subsequently, the vehicle-mounted radar may send LRR signals and MRR signals in different periods of time within at least one sending period automatically based on a quantity ratio of 1:3, such that the MRR signals are sent more than the LRR signals within the sending period. Therefore, the vehicle-mounted radar has more time to use the MRR signals for target detection.

Alternatively, when autonomous driving function information of a vehicle indicates that an ACC function is turned on, it indicates that the vehicle-mounted radar is currently in a non-congestion scenario, and there are more target objects that are far from the vehicle-mounted radar, that is, more target objects are far from the vehicle. In this case, the vehicle-mounted radar further requires an LRR signal with a small sweeping bandwidth and a long detection distance. Therefore, the vehicle-mounted radar may determine that the configuration information is the first configuration information. Subsequently, the vehicle-mounted radar may send LRR signals and MRR signals in different periods of time within at least one sending period automatically based on a quantity ratio of 2:1, such that the LRR signals are sent more than the MRR signals within the sending period. Therefore, the vehicle-mounted radar has more time to use the LRR signals for target detection.

Example 3: The vehicle-mounted radar receives configuration information sent by a vehicle-mounted terminal.

When the vehicle-mounted terminal sends the first configuration information to the vehicle-mounted radar, the vehicle-mounted radar may send LRR signals and MRR signals in different periods of time within at least one sending period automatically based on a quantity ratio of 2:1, such that the LRR signals are sent more than the MRR signals within the sending period. Therefore, the vehicle-mounted radar has more time to use the LRR signals for target detection.

Alternatively, when the vehicle-mounted terminal sends the second configuration information to the vehicle-mounted radar, the vehicle-mounted radar may send LRR signals and MRR signals in different periods of time within at least one sending period automatically based on a quantity ratio of 1:3, such that the MRR signals are sent more than the LRR signals within the sending period. Therefore, the vehicle-mounted radar has more time to use the MRR signals for target detection.

It can be seen from the foregoing Examples 1 to 3, when the method in the embodiments of this application is applied, the vehicle-mounted radar may adaptively improve a degree of matching between a radar waveform and a scenario using a movement scenario. In addition, when a vehicle distance is short, LRR signals are also sent at a low density, and when the vehicle distance is long, MRR signals are also sent at a low density. Therefore, driving security performance is improved.

According to the radio signal sending method provided in the embodiments of this application, the radio signal sending apparatus may send, based on the ratio that is of the quantity of the first data update periods to the quantity of the second data update periods and that is indicated by the configuration information, the first radio signal within the first data update period in the at least one sending period, and send the second radio signal within the second data update period in the at least one sending period. In this manner, the radio signal sending apparatus can transmit the first radio signal and the second radio signal in different periods of time within one sending period, such that mutual interference between the first radio signal and the second radio signal can be effectively reduced. When the radio signal sending apparatus is disposed on a vehicle, driving security performance can be improved.

It should be understood that although the foregoing method embodiments are described in detail using an example in which the radio signals include the first radio signal and the second radio signal, a person skilled in the art may understand that the foregoing method embodiments include but are not limited to a scenario in which the first radio signal and the second radio signal are sent. When a same radio signal sending apparatus is multiplexed to send a plurality of radio signals with different waveform configurations, the radio signal sending method provided in the embodiments of this application is still applicable, for example, a third radio signal and/or a fourth radio signal may be further included, or even more radio signals with different waveform configurations may be included. Details are not described herein again.

Figure 9:
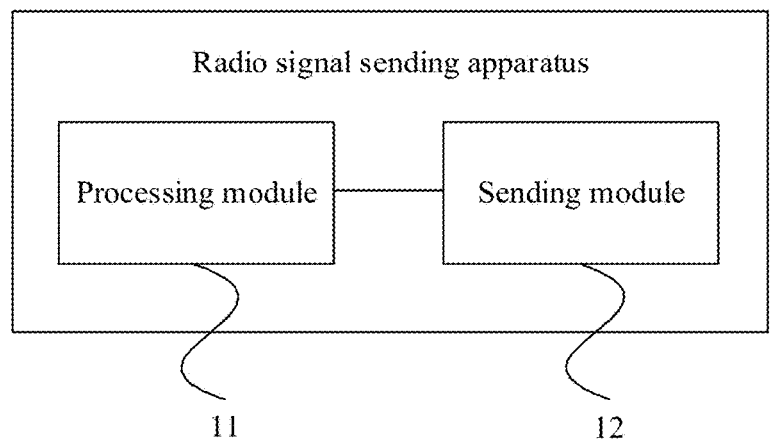
FIG. 9 is a schematic structural diagram of a radio signal sending apparatus according to an embodiment of this application.

FIG. 9 is a schematic structural diagram of a radio signal sending apparatus according to an embodiment of this application. In this embodiment of this application, a sending period of radio signals includes at least one first data update period and at least one second data update period, and the radio signals include a first radio signal and a second radio signal. As shown in FIG. 9, the radio signal sending apparatus may include a processing module 11 and a sending module 12.

The processing module 11 is configured to obtain configuration information. The configuration information is used to indicate a ratio of a quantity of the first data update periods to a quantity of the second data update periods, the first data update period is used to send the first radio signal, the second data update period is used to send the second radio signal, and waveform configurations of the first radio signal and the second radio signal are different. Optionally, the waveform configuration may include at least one of the following: a radio signal class, a radio signal sweeping bandwidth, radio signal duration, or a radio signal center frequency.

The sending module 12 is configured to transmit the first radio signal and the second radio signal within at least one sending period of the radio signal based on the configuration information.

In a possible implementation, the ratio of the quantity of the first data update periods to the quantity of the second data update periods meets one of the following: the quantity of the first data update periods is greater than the quantity of the second data update periods; or the quantity of the first data update periods is less than the quantity of the second data update periods; or the quantity of the first data update periods is equal to the quantity of the second data update periods.

In a possible implementation, the ratio of the quantity of the first data update periods to the quantity of the second data update periods is related to a movement scenario. Optionally, the processing module 11 is configured to obtain first configuration information. A quantity ratio indicated by the first configuration information represents that the quantity of the first data update periods is greater than the quantity of the second data update periods, and the first configuration information corresponds to a first movement scenario. Alternatively, the processing module 11 is configured to obtain second configuration information. A quantity ratio indicated by the second configuration information represents that the quantity of the first data update periods is less than the quantity of the second data update periods, and the second configuration information corresponds to a second movement scenario.

In an example, the first movement scenario is a non-congestion scenario, and/or the second movement scenario is a congestion scenario. In this example, if the waveform configuration includes the radio signal sweeping bandwidth, a sweeping bandwidth of the first radio signal is less than a sweeping bandwidth of the second radio signal. For another example, the first movement scenario is a congestion scenario; and/or the second movement scenario is a non-congestion scenario. In this example, if the waveform configuration includes the radio signal sweeping bandwidth, a sweeping bandwidth of the first radio signal is greater than a sweeping bandwidth of the second radio signal.

In a possible implementation, the processing module 11 is configured to determine the configuration information. Optionally, the configuration information is determined based on at least one of the following: a detection result of a target object, a moving speed of the radio signal sending apparatus, or location information of the radio signal sending apparatus.

For example, if the detection result of the target object includes a distance between the radio signal sending apparatus and the target object, the processing module 11 is configured to: when the distance between the radio signal sending apparatus and the target object is greater than or equal to a first preset threshold, and/or the moving speed of the radio signal sending apparatus is greater than or equal to a third preset threshold, determine that the configuration information is the first configuration information, where the quantity ratio indicated by the first configuration information represents that the quantity of the first data update periods is greater than the quantity of the second data update periods; or the processing module 11 is configured to: when the distance between the radio signal sending apparatus and the target object is less than or equal to a second preset threshold, and/or the moving speed of the radio signal sending apparatus is less than or equal to a fourth preset threshold, determine that the configuration information is the second configuration information, where the quantity ratio indicated by the second configuration information represents that the quantity of the first data update periods is less than the quantity of the second data update periods. The first preset threshold is greater than the second preset threshold, and the third preset threshold is greater than the fourth preset threshold.

In another possible implementation, the processing module 11 is configured to obtain the configuration information based on first indication information used to indicate a third movement scenario or the configuration information, where a mapping relationship exists between the third movement scenario and the configuration information. Optionally, the first indication information is from a user or the terminal device.

In another possible implementation, the processing module 11 is configured to receive configuration information from a terminal device or a user, where the configuration information corresponds to a third movement scenario.

Optionally, the third movement scenario may be the first movement scenario or the second movement scenario. Alternatively, the third movement scenario may be another movement scenario different from the first movement scenario and the second movement scenario. A quantity of movement scenarios is not specifically limited in this application. Each movement scenario has corresponding configuration information.

The radio signal sending apparatus in this embodiment of this application may perform actions of the radio signal sending apparatus in the foregoing method embodiments. Implementation principles and technical effects thereof are similar, and details are not described herein again.

It should be noted that, it should be understood that the sending module 12 may be actually implemented as a transmitter, and the processing module 11 may be implemented in a form of software invoked by a processing element, or may be implemented in a form of hardware. For example, the processing module 11 may be an independently disposed processing element, or may be integrated into a chip of the foregoing device for implementation. In addition, the processing module 11 may be stored in a memory of the foregoing device in a form of program code, and invoked by a processing element of the foregoing device to perform the functions of the processing module. In addition, all or some of the modules may be integrated together, or may be implemented independently. The processing element may be an integrated circuit and has a signal processing capability. In an implementation process, steps in the foregoing methods or the foregoing modules can be implemented using a hardware integrated logical circuit in the processing element, or using instructions in a form of software.

For example, the foregoing modules may be configured as one or more integrated circuits for implementing the foregoing method, such as one or more application-specific integrated circuits (ASICs), one or more microprocessors (e.g., a digital signal processor (DSP)), or one or more field programmable gate arrays (FPGAs). For another example, when one of the foregoing modules is implemented in a form of scheduling program code by a processing element, the processing element may be a general purpose processor, for example, a central processing unit (CPU) or another processor that can invoke the program code. For another example, these modules may be integrated together and implemented in a form of a system-on-a-chip (SOC).

Figure 10:
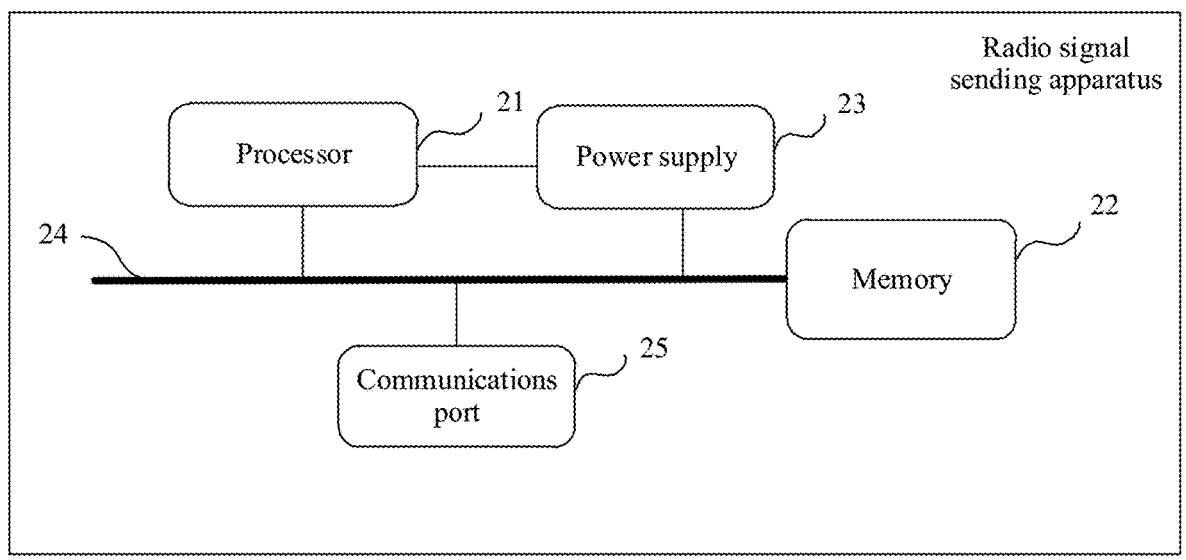
FIG. 10 is a schematic structural diagram of another radio signal sending apparatus according to an embodiment of this application.

FIG. 10 is a schematic structural diagram of another radio signal sending apparatus according to an embodiment of this application. As shown in FIG. 10, the radio signal sending apparatus may include a processor 21 (for example, a CPU) and a memory 22. The memory 22 may include a high-speed random access memory (RAM), or may include a nonvolatile memory (NVM), for example, at least one magnetic disk memory. The memory 22 may store various instructions, to complete various processing functions and implement method steps of this application. Optionally, the radio signal sending apparatus in this embodiment of this application may further include a power supply 23, a communications bus 24, and a communications port 25. The communications bus 24 is configured to implement a communications connection between elements. The communications port 25 is configured to implement connection and communications between the radio signal sending apparatus and another peripheral.

Optionally, the radio signal sending apparatus may further include at least one of a transmit antenna, a receive antenna, a frequency mixer, an oscillator, a low-pass filter, a directional coupler, or the like. The transmit antenna and the receive antenna are configured to support the radio signal sending apparatus to perform radio communications, the transmit antenna supports radio signal transmission, and the receive antenna supports radio signal reception and/or reflection signal reception, to finally implement a detection function. The processor 21 performs some possible determining and/or processing functions, and further controls operations of the transmit antenna and/or the receive antenna. For example, a signal that needs to be transmitted is controlled by the processor 21 using the transmit antenna for transmission, and a signal received using the receive antenna may be transmitted to the processor 21 for corresponding processing. The transmit antenna and the receive antenna may be independently disposed, or may be integrated as a transmit and receive antenna to perform a corresponding transmit and receive function.

In this embodiment of this application, the memory 22 is configured to store computer-executable program code, and the program code includes instructions. When the processor 21 executes the instructions, the instructions enable the processor 21 of the radio signal sending apparatus to perform actions of the radio signal sending apparatus in the foregoing method embodiment. Implementation principles and technical effects thereof are similar, and details are not described herein again.

All or some of the foregoing embodiments may be implemented using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The term "a plurality of" in this application means two or more. The term "and/or" in this specification describes only an association relationship for describing associated objects and represents that three relationships may exist. For example, A and/or B may represent the following three cases: Only A exists, both A and B exist, and only B exists. The character "/" in this specification generally indicates an "or" relationship between the associated objects. In a formula, the character "/" indicates a "division" relationship between the associated objects.

It may be understood that numerical symbols involved in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A radio signal sending method applied to a radio signal sending apparatus, wherein the radio signal sending method comprises:
    obtaining first configuration information, wherein the first configuration information indicates a first quantity of first data update periods, and wherein the first data update periods are to send a first radio signal;
    obtaining second configuration information, wherein the second configuration information indicates a second quantity of second update periods, wherein the second data update periods are to send a second radio signal, and wherein waveform configurations of the first radio signal and the second radio signal are different;
    obtaining a ratio of simultaneous first update periods to second update periods, wherein the ratio indicates either a first movement scenario, a second movement scenario, or a stationary scenario;
    obtaining a sending period comprising a first data update period and a second data update period; and
    transmitting, based on the movement scenario, the first radio signal and the second radio signal within at least one sending period.

2. The radio signal sending method according to claim 1, wherein the waveform configurations comprise at least one of a radio signal class, a radio signal sweeping bandwidth, a radio signal duration, or a radio signal center frequency.

3. The radio signal sending method according to claim 1, wherein obtaining the ratio of first update periods to second update periods that indicates either the first movement scenario, the second movement scenario, or the stationary scenario comprises:
    obtaining the first movement scenario when the ratio represents that the first quantity of the first data update periods is greater than the second quantity of the second data update periods;
    obtaining the second movement scenario when the ratio represents that the first quantity of the first data update periods is less than the second quantity of the second data update periods; and
    obtaining the stationary scenario when the ratio represents that the first quantity of the first data update periods is equal to the second quantity of the second data update periods.

4. The radio signal sending method according to claim 3, wherein the first movement scenario is a non-congestion scenario and/or the second movement scenario is a congestion scenario.

5. The radio signal sending method according to claim 3, wherein the waveform configurations comprise a radio signal sweeping bandwidth, and wherein a first sweeping bandwidth of the first radio signal is less than a second sweeping bandwidth of the second radio signal.

6. The radio signal sending method according to claim 1, wherein obtaining the configuration information comprises one of:
  obtaining the configuration information based on first indication information indicating a third movement scenario or the configuration information, wherein a mapping relationship exists between the third movement scenario and the configuration information; or
  receiving the configuration information from a terminal device or a user, wherein the configuration information corresponds to a third movement scenario.

7. The radio signal sending method according to claim 6, wherein:
  the first indication information is received from the user or the terminal device; or
  the configuration information is obtained based on a detection result of a target object, a moving speed of the radio signal sending apparatus, or location information of the radio signal sending apparatus.

8. The radio signal sending method according to claim 7, wherein the detection result of the target object comprises a distance between the radio signal sending apparatus and the target object, and wherein obtaining the configuration information comprises:
  obtaining first configuration information when the distance between the radio signal sending apparatus and the target object is greater than or equal to a first preset threshold and/or the moving speed of the radio signal sending apparatus is greater than or equal to a third preset threshold, wherein a first quantity ratio indicated by the first configuration information represents that the first quantity of the first data update periods is greater than the second quantity of the second data update periods; and
  obtaining second configuration information when the distance between the radio signal sending apparatus and the target object is less than a second preset threshold and/or the moving speed of the radio signal sending apparatus is less than a fourth preset threshold, wherein a second quantity ratio indicated by the second configuration information represents that the first quantity of the first data update periods is less than the second quantity of the second data update periods,
  wherein the first preset threshold is greater than the second preset threshold, and wherein the third preset threshold is greater than the fourth preset threshold.

9. A radio signal sending apparatus, comprising:
  one or more processors; and
  a non-transitory storage medium in communication with the one or more processors and configured to store program instructions that, when executed by the one or more processors, cause the radio signal sending apparatus to:
  obtain first configuration information, wherein the first configuration information indicates a first quantity of first data update periods, and wherein the first data update periods are to send a first radio signal;
  obtain second configuration information, wherein the second configuration information indicates a second quantity of second update periods, wherein the second data update periods are to send a second radio signal, and wherein waveform configurations of the first radio signal and the second radio signal are different;
  obtain a ratio of simultaneous first update periods to second update periods, wherein the ratio indicates either a first movement scenario, a second movement scenario, or a stationary scenario;
  obtain a sending period comprising a first data update period and a second data update period; and
  transmit, based on the movement scenario, the first radio signal and the second radio signal within at least one sending period.

10. The radio signal sending apparatus according to claim 9, wherein the waveform configuration comprises at least one of a radio signal class, a radio signal sweeping bandwidth, a radio signal duration, or a radio signal center frequency.

11. The radio signal sending apparatus according to claim 9, wherein the program instructions further cause the radio signal sending apparatus to:
  obtain the first movement scenario when the ratio represents that the first quantity of the first data update periods is greater than the second quantity of the second data update periods;
  obtain the second movement scenario when the ratio represents that the first quantity of the first data update periods is less than the second quantity of the second data update periods; and
  obtain the stationary scenario when the ratio represents that the first quantity of the first data update periods is equal to the second quantity of the second data update periods.

12. The radio signal sending apparatus according to claim 11, wherein the first movement scenario is a non-congestion scenario and/or the second movement scenario is a congestion scenario.

13. The radio signal sending apparatus according to claim 11, wherein the waveform configuration comprises a radio signal sweeping bandwidth, and wherein a first sweeping bandwidth of the first radio signal is less than a second sweeping bandwidth of the second radio signal.

14. The radio signal sending apparatus according to claim 9, wherein the program instructions further cause the radio signal sending apparatus to:
  obtain the configuration information based on first indication information indicating a third movement scenario or the configuration information, wherein a mapping relationship exists between the third movement scenario and the configuration information; or
  receive the configuration information from a terminal device or a user, wherein the configuration information corresponds to a third movement scenario.

15. The radio signal sending apparatus according to claim 14, wherein:
  the first indication information is received from the user or the terminal device; or
  the configuration information is obtained based on a detection result of a target object, a moving speed of the radio signal sending apparatus, or location information of the radio signal sending apparatus.

16. A non-transitory computer-readable storage medium configured to store instructions executable by one or more processors to perform a method comprising:
  obtaining first configuration information, wherein the first configuration information indicates a first quantity of first data update periods, and wherein the first data update periods are to send a first radio signal;

obtaining second configuration information, wherein the second configuration information indicates a second quantity of second update periods, wherein the second data update periods are to send a second radio signal, and wherein waveform configurations of the first radio signal and the second radio signal are different;

obtaining a ratio of simultaneous first update periods to second update periods, wherein the ratio indicates either a first movement scenario, a second movement scenario or a stationary scenario;

obtaining a sending period comprising a first data update period and a second data update period; and transmitting, based on the movement scenario, the first radio signal and the second radio signal within at least one sending period.

17. The non-transitory computer-readable storage medium according to claim 16, wherein the instructions are further executable by the one or more processors to:

obtain the first movement scenario, when the ratio represents that the first quantity of the first data update periods is greater than the second quantity of the second data update periods;

obtain the second movement scenario when the ratio represents that the first quantity of the first data update periods is less than the second quantity of the second data update periods; and obtain the stationary scenario when the ratio represents that the first quantity of the first data update periods is equal to the second quantity of the second data update periods.

18. The non-transitory computer-readable storage medium according to claim 16, wherein the instructions are further executable by the one or more processors to:

obtain first configuration information when a distance between the radio signal sending apparatus and the target object is greater than a first preset threshold and/or a moving speed of the radio signal sending apparatus is greater than a third preset threshold, wherein a first quantity ratio indicated by the first configuration information represents that the first quantity of the first data update periods is greater than the second quantity of the second data update periods; and obtain second configuration information when a distance between the radio signal sending apparatus and the target object is less than or equal to a second preset threshold and/or a moving speed of the radio signal sending apparatus is less than or equal to a fourth preset threshold, wherein a second quantity ratio indicated by the second configuration information represents that the first quantity of the first data update periods is less than the second quantity of the second data update periods, wherein the first preset threshold is greater than the second preset threshold, and wherein the third preset threshold is greater than the fourth preset threshold.

19. The non-transitory computer-readable storage medium according to claim 16, wherein the waveform configurations comprise at least one of a radio signal class, a radio signal sweeping bandwidth, a radio signal duration, or a radio signal center frequency.

20. The non-transitory computer-readable storage medium according to claim 16, wherein the instructions are further executable by the one or more processors to:

receive the first indication information from the terminal device; or obtain the configuration information based on a detection result of a target object, a moving speed of the radio signal sending apparatus, or location information of the radio signal sending apparatus.

* * * * *

UNITED STATES PATENT AND TRADEMARK OFFICE
CERTIFICATE OF CORRECTION

PATENT NO. : 12,210,113 B2  
APPLICATION NO. : 17/390310  
DATED : January 28, 2025  
INVENTOR(S) : Lutao Gao, Sha Ma and Sida Song Page 1 of 1

It is certified that error appears in the above-identified patent and that said Letters Patent is hereby corrected as shown below:

On the Title Page

(71) Applicant: "Huawei Technologies Co., Ltd., Shenzhen (CN)" should read "Shenzhen Yinwang Intelligent Technologies Co., Ltd., Shenzhen (CN)"

Signed and Sealed this
Twenty-fifth Day of March, 2025

Coke Morgan Stewart
*Acting Director of the United States Patent and Trademark Office*